United States Patent
Yadav et al.

(10) Patent No.: US 8,208,463 B2
(45) Date of Patent: Jun. 26, 2012

(54) SUBNET SCOPED MULTICAST / BROADCAST PACKET DISTRIBUTION MECHANISM OVER A ROUTED NETWORK

(75) Inventors: Navindra Yadav, San Jose, CA (US); James Rivers, Saratoga, CA (US); Gnanaprakasam Pandian, Cupertino, CA (US); Pauline Shuen, Palo Alto, CA (US); Scott Emery, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 540 days.

(21) Appl. No.: 11/552,490

(22) Filed: Oct. 24, 2006

(65) Prior Publication Data
US 2008/0095160 A1   Apr. 24, 2008

(51) Int. Cl.
*H04L 12/28* (2006.01)
(52) U.S. Cl. .......................... 370/389; 709/232
(58) Field of Classification Search ................ 370/389, 370/390, 432; 709/232, 234, 236
See application file for complete search history.

(56) References Cited

U.S. PATENT DOCUMENTS

| | | | |
|---|---|---|---|
| 5,959,989 A | 9/1999 | Gleeson et al. | |
| 6,182,147 B1 | 1/2001 | Farinacci | |
| 6,483,832 B1* | 11/2002 | Civanlar et al. | 370/390 |
| 6,785,274 B2 | 8/2004 | Mahajan et al. | |
| 6,839,348 B2 | 1/2005 | Tang et al. | |
| 6,847,638 B1 | 1/2005 | Wu et al. | |
| 7,016,351 B1 | 3/2006 | Farinacci et al. | |
| 7,095,739 B2 | 8/2006 | Mamillapalli et al. | |
| 7,304,996 B1* | 12/2007 | Swenson et al. | 370/394 |
| 7,385,977 B2 | 6/2008 | Wu et al. | |
| 7,423,986 B2 | 9/2008 | Grayson et al. | |
| 2002/0026525 A1* | 2/2002 | Armitage | 709/238 |
| 2002/0141418 A1* | 10/2002 | Ben-Dor et al. | 370/398 |
| 2006/0187858 A1* | 8/2006 | Kenichi et al. | 370/254 |

OTHER PUBLICATIONS

"Internet Protocol (IP) Multicast," Cisco Systems, Inc., Aug. 2000, pp. 1-15.
"Multicast Deployment Made Easy," Cisco Systems, Inc., Jul. 1999, pp. 1-20.

* cited by examiner

*Primary Examiner* — Robert Wilson
*Assistant Examiner* — Wei Zhao
(74) *Attorney, Agent, or Firm* — Cesari and McKenna, LLP

(57) ABSTRACT

In one embodiment, receiving a data packet in a data forwarding domain, encapsulating a header to the received data packet, and routing the encapsulated data packet in the data forwarding domain over a distribution tree are provided.

19 Claims, 7 Drawing Sheets

SUBNET SCOPED MULTICAST / BROADCAST PACKET DISTRIBUTION MECHANISM OVER A ROUTED NETWORK

TECHNICAL FIELD

The present disclosure relates generally to providing subnet scoped multicast or broadcast traffic forwarding mechanism in data networks.

BACKGROUND

Existing topology for local area networks (LANs) typically include Ethernet as a layer 2 protocol and an internet protocol (IP) v4 or v6 as a layer 3 protocol. This layered approach allows computing devices to communicate using a variety of different layer 3 protocols such as IP, IPX, or Appletalk and so on which were available. Likewise, computers could use a single layer 3 protocol such as IPv4/IPv6 to communicate while connected via different layer 2 networks (such as FDDI, TokenRing, ATM, or Ethernet).

The IPv4/IPv6 protocol that are used to establish communication paths at the end nodes (for example, such as ARP/Neighbor Discovery and ICMP) are subject to a variety of spoofing, man-in-the-middle, and denial of service attacks (such as, for example, that may be launched against hosts in the same subnet which is a layer 2 domain), but on the other hand, are blocked by the IPv4/IPv6 forwarding devices such as routers. Furthermore, configuration of routers and tuning the routing protocols is a very involved process.

In addition, typical Ethernet multicast/flooding functions depend on all host devices in the subnet to be attached to the same broadcast domain on an Ethernet LAN or, attached to the same Virtual LAN (VLAN). IPv4 and IPv6 subnet scoped multicast, subnet scoped broadcast traffic make use of layer 2 media (for example, Ethernet) multicast/flooding function. An example of subnet scoped multicast is traffic sent with an IPv4 destination address of 224.0.0.X (where x is any number between 0 and 255). An example of subnet scoped broadcast is traffic sent with IPv4 destination address of 255.255.255.255.

SUMMARY

Overview

A method in particular embodiments may include receiving a data packet in a data forwarding domain, encapsulating a header to the received data packet, and routing the encapsulated data packet in the data forwarding domain over a distribution tree.

A method particular embodiments may include opening a point to point unicast tunnel with one or more network devices in a data forwarding domain, receiving a data packet, tunneling the received data packet to the one or more network devices in the data forwarding domain.

An apparatus in particular embodiments includes a network interface, one or more processors coupled to the network interface, and a memory for storing instructions which, when executed by the one or more processors, causes the one or more processors to receive a data packet in a data forwarding domain, encapsulate a header to the received data packet, and route the encapsulated data packet in the data forwarding domain over a distribution tree.

An apparatus in particular embodiments may include a network interface, one or more processors coupled to the network interface, and a memory for storing instructions which, when executed by the one or more processors, causes the one or more processors to open a point to point unicast tunnel with one or more network devices in a data forwarding domain, receive a multicast packet, and tunnel the received data packet to the one or more network devices in the data forwarding domain.

A system particular embodiments may include means for receiving a data packet in a data forwarding domain, means for encapsulating a header to the received data packet, and means for routing the encapsulated data packet in the data forwarding domain over a distribution tree.

These and other features and advantages of the present invention will be understood upon consideration of the following detailed description of the invention and the accompanying drawings.

DESCRIPTION OF EXAMPLE EMBODIMENTS

Figure 1:
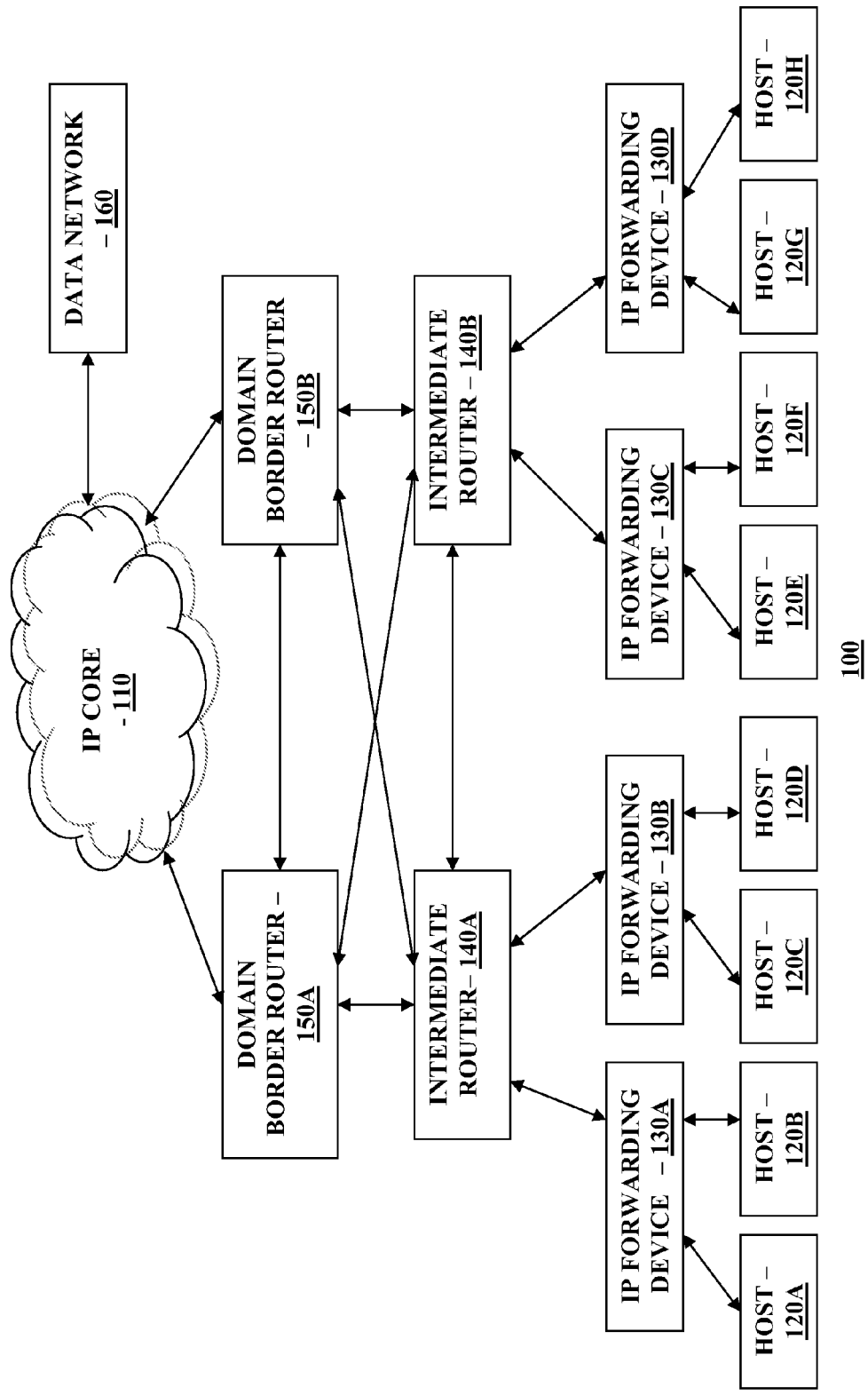
FIG. 1 illustrates an example system of an IP forwarding domain for routing subnet scoped multicast traffic.

FIG. 1 is a block diagram of an enterprise access data network seen in the wiring closet, for practicing particular embodiments. Referring to FIG. 1, in particular embodiments, the overall network 100 includes a plurality of Layer 3 IPv4/IPv6 (Internet Protocol) forwarding domains (also referred to as Routing to the Socket domains), each including domain border routers 150A, 150B. Each of the domain border routers 150A, 150B are further connected to a respective intermediate router 140A, 140B, and further, each intermediate router 140A, 140B are coupled to one or more IPv4/IPv6 forwarding devices 130A, 130B, 130C, 130D as shown in FIG. 1. Referring back to FIG. 1, further shown is a plurality of end hosts 120A, 120B, 120C, 120D, 120E, 120F, 120G, 120H, each connected to one of the IPv4/IPv6 forwarding devices 130A, 130B, 130C, 130D in the overall network 100.

In this manner, referring to FIG. 1, in a particular embodiments, each Layer 3 IPv4/IPv6 forwarding domain (Routing to the Socket domain) includes, a domain border router such as, for example, a switch that connects the Layer 3 IPv4/IPv6 forwarding domains, for example, to the rest of the enterprise network. Further, each domain border router 150A, 150B in particular embodiments is connected to the intermediate routers 140A, 140B within the respective Layer 3 IPv4/IPv6 forwarding domain, where the intermediate routers 140A, 140B may include distribution switches. The IPv4/IPv6 forwarding devices 130A, 130B, 130C, 130D in particular embodiments may include access switches, and further, where each IPv4/IPv6 forwarding device 130A, 130B, 130C, 130D is configured as the first hop Layer 3 IPv4/IPv6 forwarding device for the respectively coupled hosts 120A, 120B, 120C, 120D, 120E, 120F, 120G, 120H.

Referring back to FIG. 1, in particular embodiments, the domain border routers 150A, 150B may be configured to connect to more than one Layer 3 IPv4/IPv6 forwarding domain. That is, domain border router 150A may be connected to both intermediate routers 140A and 140B, and further, domain border router 150B may be connected to both intermediate routers 140A and 140B. In one aspect, if the domain border router 150A or 150B interconnects multiple Layer 3 IPv4/IPv6 forwarding domains, the interface on the domain border router 150A or 150B are associated to all of the multiple Layer 3 IPv4/IPv6 forwarding domains.

As discussed in further detail below, the IPv4/IPv6 forwarding devices 130A, 130B, 130C, 130D, intermediate routers 140A, 140B and the domain border routers 150A, 150B in the Layer 3 IPv4/IPv6 forwarding domains in particular embodiments are configured to run a routing protocol to determine the respective domain topology and the respective hosts 120A, 120B, 120C, 120D, 120E, 120F, 120G, 120H, that are connected to the respective Layer 3 IPv4/IPv6 forwarding domain.

Figure 2:
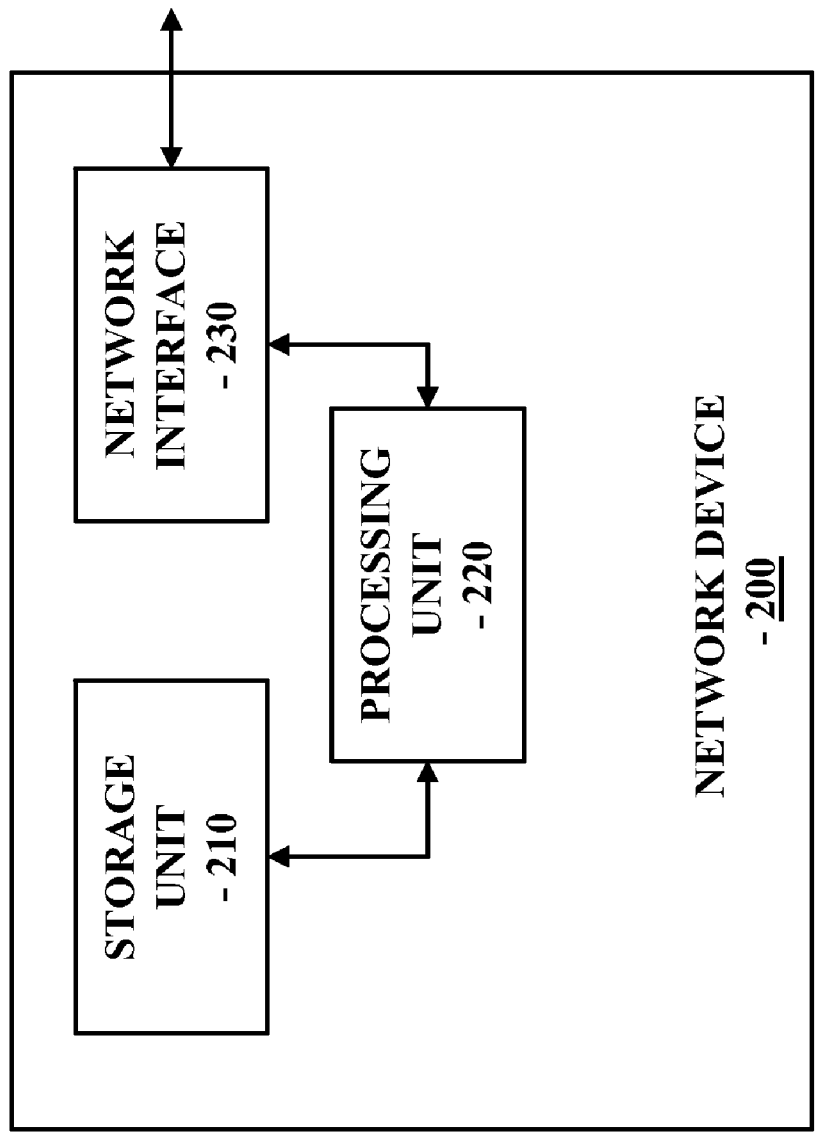
FIG. 2 illustrates an example network device in the system illustrated in FIG. 1.

FIG. 2 illustrates an example network device in the system illustrated in FIG. 1. Referring to FIG. 2, the network device 200 in particular embodiments includes a storage unit 210 operatively coupled to a processing unit 220. In particular embodiments, the processing unit 220 may include one or more microprocessors for retrieving and/or storing data from the storage unit 210, and further, for executing instructions stored in, for example, the storage unit 210, for implementing one or more associated functions related to subnet scoped multicast or broadcast data traffic distribution. Referring again to FIG. 2, in one aspect, the network device 200 may include a network interface 230 which may be configured to include or interface with one or more of the other devices including, for example, one or more hosts 120A, 120B, 120C, 120D, 120E, 120F, 120G, 120H, one or more IPv4/IPv6 forwarding devices 130A, 130B, 130C, 140D, one or more intermediate routers 140A, 140B, one or more domain border routers 150A, 150B, or the IPv4IPv6 Core 110 (FIG. 1).

In particular embodiments, as discussed in further detail below, the memory or storage unit 210 of the network device may be configured to store instructions which may be executed by the processing unit 220 to receive a data packet in a data forwarding domain, encapsulate a header to the received data packet, and route the encapsulated data packet in the data forwarding domain over a distribution tree.

Address Allocation for IP Forwarding Devices

In particular embodiments, the hosts 120A, 120B, 120C, 120D, 120E, 120F, 120G, 120H, and the IP forwarding devices 130A, 130B, 130C, 130D within the Layer 3 IP forwarding domains are associated with one or more IP addresses for transmitting and receiving data traffic. In one aspect, the hosts 120A, 120B, 120C, 120D, 120E, 120F, 120G, 120H, and the IP forwarding devices 130A, 130B, 130C, 130D may belong to any one of the subnets that are managed by the respective Layer 3 IP forwarding domain.

More particularly, each IP forwarding device 130A, 130B, 130C, 130D in the Layer 3 IP forwarding domain needs at least one IP address that is uniquely associated within the network. That is, in particular embodiments, in the Layer 3 IP forwarding domain, one IP address is used for loop back interface, and all other interfaces in the respective IP forwarding device to be unnumbered interfaces. To allocate a loop back IP address to an IP forwarding device, a block of addresses from a subnet may be reserved. In one aspect, the block of addresses may not come from a single subnet of a Layer 3 IP forwarding domain. Indeed, in particular embodiments, when the block of address is assigned from a single subnet, the debugging procedure may be simplified.

In particular embodiments, the IP address of an IP forwarding device may be assigned based on user configuration, or by using DHCP, or by assignment from the respective domain border router. More specifically, the IP forwarding device may be configured with an IP address at the boot up time. Alternatively, the IP forwarding device may be configured to use DHCP to retrieve an IP address from a server in the network.

In addition, the domain border router may be configured to assign an IP address to the IP forwarding devices in the Layer 3 IP forwarding domains when an IP forwarding device joins the Layer 3 IP forwarding domain. More specifically, the network administrator may configure a domain border router with one or more subnets which will be used for all IP forwarding devices in a particular Layer 3 IP forwarding domain. As such, when the domain border router assigns an IP address to an IP forwarding device, the domain border router is configured in particular embodiments to generate a map between the IP forwarding device's MAC address and the assigned IP address. The generated map may then be used to provide the same IP address when the IP forwarding device reboots.

In a further aspect, the administrator may configure another loop back IP address for network management purposes, separating the management IP address from the operational IP address. This approach may provide improved troubleshooting and network security. More specifically, the administrator may configure the network such that only management IP address is allowed for telnet and other purposes. Other security mechanism such as Access Control Lists (ACLs) may be applied on the management IP address. Using a separate IP address for network management, the administrator may configure a subnet or a set of IP addresses with an active router.

In particular embodiments, the domain border router 150A, 150B are configured with an IP address from each subnet. The IP address is used, in particular embodiments, to assign IP addresses to the respective one or more hosts 120A, 120B, 120C, 120D, 120E, 120F, 120G, 120H from a DHCP server, for example, as discussed in further detail below.

Host IP Address Allocation

As discussed above, referring back to FIG. 1, each host 120A, 120B, 120C, 120D, 120E, 120F, 120G, 120H in the Layer 3 IP forwarding domain is associated with one of the subnets of the respective Layer 3 IP forwarding domain. In particular embodiments, the hosts 120A, 120B, 120C, 120D, 120E, 120F, 120G, 120H may be configured to acquire the IP address by, for example, user configuration or via the DHCP server. That is, in particular embodiments, the network administrator may manually configure a static IP address on the respective one of the hosts 120A, 120B, 120C, 120D, 120E, 120F, 120G, 120H.

Alternatively, using the DHCP server, the hosts 120A, 120B, 120C, 120D, 120E, 120F, 120G, 120H may be configured to use DHCP protocol to acquire a respective IP address. More specifically, the respectively coupled IP forwarding devices 130A, 130B, 130C, 130D are configured as a DHCP relay agent, where a predefined hint value is provided to the DHCP server. The DHCP server in particular embodiments may be configured to use the predefined hint value received from the IP forwarding device to determine an appropriate subnet and an IP address for the particular host. Given that each IP forwarding device 130A, 130B, 130C, 130D has only one loop back address and may be from a single subnet, the use of such a loop back address may result in assigning an IP address from a single subnet for all hosts 120A, 120B, 120C, 120D, 120E, 120F, 120G, 120H in the Layer 3 IP forwarding domain.

It is to be noted that in particular embodiments, the IP address of the host in the Layer 3 IP forwarding domain must belong to one of the subnets of the Layer 3 IP forwarding domain. If this is not the case, then the host route information is not propagated throughout the Layer 3 IP forwarding domain by the respective IP forwarding device. Accordingly, in particular embodiments, the IP forwarding device may be configured to verify that all IP addresses of the hosts connected to the IP forwarding device are part of the subnets that are contained within the Layer 3 IP forwarding domain.

Host Learning Mechanism

To forward traffic to a host, the IP forwarding device in particular embodiments is configured to learn the paths to reach the hosts in a given Layer 3 IP forwarding domain. That is, the IP forwarding device in particular embodiments is configured to learn all its associated hosts and then, propagate the host association information throughout the Layer 3 IP forwarding domain. In one aspect, the IP forwarding device may be configured to perform host learning mechanisms using one or more of the following approaches: (1) static configuration which provides a binding of the host IP address to layer 2 rewrite address (for example, MAC address) along with the port and IP forwarding device to which the host is attached, (2) snooping DHCP message exchanges between the host and a trusted DHCP Server, (3) wireless access point (WAP)'s host database, (4) solicited ARP reply packet inspection, (5) unsolicited/gratuitous ARP reply, or (6) learning the source IP address from IP packet inspection.

More specifically, in particular embodiments, IP forwarding device may be configured to learn the information of the associated hosts based on administrator configuration and association of an IP address of the host to a port of a switch (e.g., forwarding device) in the Layer 3 IP forwarding domain. In this approach, the administrator may configure the MAC address of the host, which provides sufficient information for the associated IP forwarding device to forward the traffic to the connected host.

Using DHCP snooping, when a host uses DHCP to acquire an IP address, in particular embodiments, the packets are snooped and the binding between MAC address, IP address and the associated port are learned by the respective IP forwarding device. The WAP's host database may be built using a predefined control signaling between the Wireless Access Point (WAP) and the IP forwarding device, or alternatively, using control signaling between the IP forwarding device and another trusted entity (for example, such as a wireless controller device) responsible for handling wireless device authentication and association. Alternatively, in a further embodiment, in the case of using WAP's host database, the wireless access points are configured to build a list of all associated hosts which may be used to learn the associated hosts. In one aspect, the wireless access point may use the information indicating the list of associated hosts when the wireless access point is configured as an IP forwarding device. Alternatively, the wireless access point may be configured to provide the information indicating the list of associated hosts to the IP forwarding device to which it is connected.

In the case where ARP reply packet inspection is performed to determine the hosts, the IP forwarding device may be configured in particular embodiments to initiate a host probe by issuing an ARP request for unknown hosts in the Layer 3 IP forwarding domain. When a reply is received in response to the issued ARP request, the IP forwarding device may be configured to inspect the received packet and associate the host with the port on which the packet is received.

In a further embodiment, using IP packet inspection, the host paths to reach the hosts may be learned by the IP forwarding device in the Layer 3 IP forwarding domain. For example, when a packet is receive from an unknown source on a given port, unicast reverse path forwarding (uRPF) may be configured to trigger an exception path and send the packet to the IP forwarding device for host learning. The IP forwarding device may be configured to learn the host address if the host belongs to one of the subnets that the host manages. The packet is then allowed to be forwarded to the destination host after the host is learned. Alternatively, IP source guard or IP port security information may be used as triggers to learn the source address of the host. Furthermore, in another aspect, access control lists (ACLs) may be installed for all host routes that were learned on a given port. For new hosts, the ACL may be configured to detect and transmit the packet to the IP forwarding device to learn the new host addresses.

Route Propagation

To forward traffic in the Layer 3 IP forwarding domain 100, the IP forwarding devices 130A, 130B, 130C, 130D and routers 140A, 140B, 150A, 150B need to know the host to forwarder association. The host to forwarder association provides information to each of the forwarding devices (switches and routers) in the network 100 related to the set of forwarder(s) the particular host is connected. In one aspect, the forwarding devices (switches and routers) in the network 100 can avoid computing the path to the host by assigning the same path as it has already computed to reach the forwarder(s) associated with the particular host. The forwarder route provides information on how to reach a specific IP forwarding device, and IP addresses such as loop back interface and/or management interface of an IP forwarding device are configured to be propagated using a configured routing protocol. In addition, the host association as described above is configured to indicate the association of the host in the Layer 3 IP forwarding domain 100 to the respective connected specific IP forwarding device. That is, to send traffic to a particular host, the traffic is sent to the IP forwarding device associated with the host (for example, that is directly connected to the host). Once the path to the IP forwarding device is known, the path to the associated host (or the host route) may be determined and installed in the hardware.

In particular embodiments, a host is configured to always have one association or path with a particular IP forwarding device. On the other hand, each IP forwarding device may be configured with multiple paths. As such, in one aspect, based on the different path information, suitable routing protocol may be selected, or routes may be computed appropriately. In addition, improved scalability and performance may be achieved in the Layer 3 IP forwarding domain 100. For example, when there is a change in a link status (up or down), only one update regarding the IP forwarding device routes may be needed. Once the update is received, the host routes may or may not change. Similarly, when a host association changes only one update about that host needs to be sent.

Referring yet again to FIG. 1, since the Layer 3 IP forwarding domain 100 includes hosts and IP forwarding devices, all internal route information in a domain includes IP forwarding device routes and host association. Domain border outers 150A, 150B may be configured to advertise a subnet route or network addresses that are external to the domain.

In particular embodiments, Open Shortest Path First (OSPF) routing protocol may be used for IP forwarding device route propagation. OSPF is a link state routing protocol that provides complete topology of the network. In one aspect, OSPF routing protocol may be configured to send updates hop by hop. That is, OSPF routing protocol may be configured to advertise the IP forwarding device loop back addresses using the router links. Additionally, Enhanced Interior Gate Routing Protocol (EIGRP) may be used for IP forwarding device route propagation. EIGRP is a distance-vector protocol and provides an efficient manner in which to handle changes in network topologies. Additionally, other protocols such as Intermediate System to Intermediate System (ISIS), interior Border Gateway Protocol (iBGP) and the like may be used for route propagation.

Referring still again to FIG. 1 in particular embodiments, each IP forwarding device 130A, 130B, 130C, 130D in the Layer 3 IP forwarding domain 100 are configured with two modules—a host association learning application and a host association propagation protocol. In one aspect, the host association learning application module in the IP forwarding device is configured to learn the associations between the IP forwarding device and the respective hosts based on, for example, the host learning mechanism described above. In addition, the host association learning application may be further configured to propagate the association in the domain using a predetermined protocol, and also, to learn all other host associations from other IP forwarding devices in the domain.

Once a host association is learned as described above, the host association learning application may be configured to determine an actual path to the host which in particular embodiments, is the same as the path to the IP forwarding device that originated the host association. The path to the IP forwarding device may be available from other routing protocols that propagated the IP forwarding device routes. Moreover, the host association learning application may further be configured to install the host route in the routing table of the IP forwarding device, and in addition, to determine if there are any duplicate associations that exist in the domain based on, for example, a host move within the domain, or a duplicate IP address in the domain. If there are duplicate associations, the IP forwarding device and the advertised duplicate associations need to resolve the association as discussed in further detail below.

When duplicate associations of a host exist, only one of the associations is determined to be valid. Once an IP forwarding device that originated a host association detects a duplicate host association from another IP forwarding device, the IP forwarding devices that originated the host association need to validate whether their association with the host is valid. If the association no longer exists, then the association is withdrawn from the network.

That is, in particular embodiments, a host probe sends an ARP message to the host to see if the host is still connected. If there is no response, then the association is deemed no longer valid, and the IP forwarding device is configured to withdraw the host association that it previously advertised. On the other hand, if in response to the ARP message, the host responds, then the host association is determined to be valid. Also, if no IP forwarding device withdraws an association and a duplicate entry still exists for beyond a predetermined time period (based on, for example, duplicate IP address configuration in the domain), an error state may be logged or the port that is connected to the host may be disabled.

Referring back, the host association propagation protocol in particular embodiments may be configured to forward host associations among IP forwarding devices and provide APIs to the application that needs or sends the associations.

Additionally, interior Border Gateway Protocol (iBGP) may be used to propagate host routes in the Layer 3 IP forwarding domain 100 in accordance with particular embodiments. More specifically, each iBGP is configured to advertise only directly connected hosts, and does not advertise another other host routes. Moreover, by setting up connections with every other IP forwarding device in the domain, the iBGP process may be configured to update all other IP forwarding devices. Further, using iBGP, all host associations may be provided to an application that can monitor for duplicate host routes.

Forwarding Table Optimization

As discussed above, referring back to FIG. 1, in Layer 3 IP forwarding domain 100, data packets are forwarded based on host routes. Each IP forwarding device is configured to store host route entry in, for example, in software and/or hardware forwarding tables. Moreover, under certain conditions, the IP forwarding device may be configured to keep one host entry under multiple contexts (such as VRF) in hardware forwarding tables. In such cases, the number of entries that are needed in hardware may be multiple times the number of hosts in the Layer 3 IP forwarding domain 100. In addition, if the domain supports a large number of hosts, the number of entries in the hardware tables of the switches increases.

Accordingly, in particular embodiments, only needed entries in switch hardware may be tracked and maintained based on a predetermined procedure. More specifically, in particular embodiments, the IP forwarding device may be configured to receive the host routes (associations) from other IP forwarding devices in the domain, the IP forwarding device may be further configured to receive a subnet route entry for each subnet from corresponding subnet default routers. A default router for a subnet in particular embodiments may be configured to advertise the subnet entry.

When installing a host route, all paths (more than one path if equal cost paths exist) of a host is compared against a less specific route which, in particular embodiments, may be the subnet route paths. If subnet route paths match exactly with host paths (including equal cost routes), then the host route is not required to be installed in the forwarding table. Since the less specific or subnet route paths and the indirect host routes are reachable via distribution switches (140A or/and 140B), first hop IP forwarding devices may not need to install any indirect host routes. This may provide substantial savings in the number of entries in hardware forwarding tables. Moreover, the performance of the Layer 3 IP forwarding domain 100 may be improved since a change in a host association may not result in updating hardware tables.

In particular embodiments, the procedure described above may be applied to the domain border routers 150A, 150B in addition to the first hop IP forwarding devices. More specifically, as described above, domain border routers 150A, 150B can reach all hosts via distribution switches. For each subnet, the domain border router may be configured to install a route (equal cost routes) via distribution switches. If a host route is reachable via both distribution routes, then the host route is not required to be installed. In one aspect, the domain border routers 150A, 150B may need to install only subnet addresses for all subnets of the domain. This provides substantial optimization of hardware and software forwarding table resources and processing resources at the domain border routers 150A, 150B.

Since the subnet route paths and all indirect host routes are reachable via distribution switches (for example, the next level switches), the first hop IP forwarding devices in particular embodiments do not have to install any indirect host routes, resulting in reduced number of entries in the hardware forwarding table, and also improving the performance of the IP forwarding device since for example, a change in host association may not result in updating hardware forwarding table entries.

In particular embodiments, the IP forwarding domain may include three types of devices—domain border routers, intermediate routers, and forwarding devices (which may be switches to which there is at least one end host directly connected). Moreover, in particular embodiments, a switch may be configured to incorporate multiple features and functions of the three types of devices described above.

In the manner described above, in accordance with particular embodiments, there may be provided methods and systems for layer 3 forwarding mechanism with a distributed router using preexisting and sub-domain routing protocols. More specifically, forwarding of data traffic may be based on the IP DA addresses in the IP packet for the subnets on which layer 3 to the socket mechanism is enabled. As such, in particular embodiments, VLANs no longer span switches in the network, but rather, there are no specific VLANs associated with a subnet. As the hosts belonging to the subnet can be present anywhere in the network domain where layer 3 to the socket mechanism is enabled, host routes are only propagated within this network domain, and not advertised outside the layer 3 to the socket domain. Rather, in particular embodiments, only the subnet is advertised outside of the layer 3 to the socket network domain.

In addition, in particular embodiments, the forwarding of the traffic using layer 3 mechanism may provide optimal path forwarding, no exponential data loops (packets have Tim to Live (TTL)/hop count) or multi path forwarding, and flooding of traffic destined to an unknown destination may be prevented, for example.

IP Multicast Subnet Scoped Data Distribution

Distribution of non subnet scoped multicast IPv4/IPv6 data traffic may be achieved in the Layer 3 IP forwarding domain using existing multicast routing approaches. For example, IPv4/IPv6 Protocol Independent Multicast in Sparce Mode (PIM-SM) routing may be used in the Layer 3 IP forwarding domain for example, as shown in FIG. 1, where network interfaces may be configured as Layer 3 Outgoing Interfaces (OIFs) to a multicast routing module. On the other hand, referring back to FIG. 1, in the Layer 3 IP forwarding domain, as the hosts 120A, 120B, 120C, 120D, 120E, 120F, 120G, 120H are not connected by a single Layer 2 domain, the network traffic is not bridged between the various ports in the subnet.

Since multicast routing decrements the TTL/hop limit in the IP data packet, in the Layer 3 IP forwarding domain, in particular embodiments, the IP forwarding device (FIG. 1) may be configured to preserve the TTL/hop limit to use multicast routing for packet forwarding. For example, in particular embodiments, multicast or unicast tunneling/encapsulation and de-encapsulation may be implemented by the network entry and exist points, respectively of the Layer 3 IP forwarding domain. In addition, the TTL/hop limit may be fixed by the boundary switches (for example, one or more of the IP forwarding devices 130A, 130B, 130C, 130D) at the egress point of the Layer 3 IP forwarding domain.

More particularly, in the Layer 3 IP forwarding domain as shown in FIG. 1, data packets are primarily Layer 3 forwarded which results in a TTL/hop limit decrement as the data packet moves from one IP forwarding device (or IP forwarding node) to another. Since the subnets in the IP forwarding domain may be spread over anywhere in the IP forwarding domain, getting a broadcast or subnet scoped multicast packet to the intended receiver/destination may require the data packet to traverse across one or more IP forwarding devices (or IP forwarding nodes). In this context, broadcast may be considered a type of multicast where all of the hosts in the subnet except the broadcast sender are considered to be intended receivers of the broadcast Accordingly, in particular embodiments, tunneling may be used in the Layer 3 IP forwarding domain to preserve the TTL/hop limit. That is, in one embodiment, data packets may be encapsulated/tunneled onto a multicast distribution tree at the first hop IP forwarding device, and then de-encapsulated at the last hop IP forwarding device near the Layer 3 IP forwarding domain border. From the first hop to the last hop, data traffic may be configured to be forwarded in accordance with hardware or software configurations over the multicast distribution tree.

In particular embodiments, multicast mechanism may be used to forward a data packet efficiently (without duplicating and looping) to multiple receivers in the network. In multicast, members of a group join explicitly, while in subnet scoped broadcast, there is an implicit member join by all hosts of the subnet. Accordingly, in particular embodiments, forwarding of a subnet scoped broadcast packets may be implemented by tunneling packets over a multicast distribution tree. In further embodiments, multiple multicast distribution trees may be used to forward all broadcast traffic in the Layer 3 IP forwarding domain.

For example, multicast traffic to a group is intended to reach all receivers that are interested in the group, and which may be determined based on the group ID (*, G), or based on the combination or pair of the multicast source and group ID (S, G). In particular embodiments, each IP forwarding device in the Layer 3 IP forwarding domain may be configured to join a known multicast group, and a (*, G) multicast distribution tree may be generated. Further, each IP forwarding device may be configured to transmit subnet scoped traffic over the (*, G) multicast distribution tree. When an IP forwarding device sends traffic, an (S, G) multicast distribution tree is generated. Moreover, when an IP forwarding device receives subnet scoped packet on a directly connected interface, the received data packet to may be transmitted to all directly connected hosts that are predetermined to receive the received data packet (for example, the hosts which share the same subnet as the source). Additionally, the received data packet is encapsulated with an outer IP header with the configured multicast group, source address, TTL and the like. Thereafter, the data packet is forwarded based on the outer IP header resulting in the data packet being sent to all the IP forwarding devices.

When an IP forwarding device receives traffic over the multicast distribution tree, it makes a copy of the data packet, de-encapsulates the received data packet, and transmits the original data packet to all directly connected hosts that are supposed to receive the packet. Further, when an IP forwarding device does not transmit the data packet for a predetermined time period, in particular embodiments, the (S, G) tree may be aged out.

In particular embodiments, subnet scoped multicast or broadcast traffic may be encapsulated in a layer-4 header (for example, User Datagram Protocol (UDP)) besides the layer-3 IPv4/IPv6 multicast header discussed above. The layer-4 header may be used for passing additional context or de-multiplexing information related to the inner subnet scoped traffic. In particular embodiments, the IP forwarding devices or multicast receivers interested in the outer layer-3 IPv4/IPv6 multicast header may make use of the addition layer-4 header added, and further, may remove it before the original inner packet is handed off or transmitted to the final, interested set of hosts or end points.

Referring again to FIG. 1, in particular embodiments, multicast traffic distribution in the Layer 3 IP forwarding domain may include shared tree based traffic distribution, unicast tunnels based traffic distribution, or flooding with designated reverse path forwarding (RPF) interface selection logic. Each approach is discussed in further detail below.

Shared Tree Based Traffic Distribution

Referring back to FIG. 1, in shared tree based multicast traffic distribution in the Layer 3 IP forwarding domain, in particular embodiments, each IP forwarding device 130A, 130b, 130C, 130D may be configured to join a shared multicast distribution tree. Further, group addresses for each shared multicast distribution tree may be reserved, advertised or configured. In this manner, data traffic that is to be sent to the subnet scoped multicast/broadcast group is pushed into the multicast distribution tree by the ingress IP forwarding device.

The multicast distribution tree may be configured to be repaired or rebuilt when a transit IP forwarding device fails in the Layer 3 IP forwarding domain, or when a transmit link is lost. In this case, an alternate transmit link or path may be selected and the multicast distribution tree may be reconstructed using the alternate transmit link. Messages associated with multicast distribution tree construction are unicast and send from each hop to the next hop starting with the switch device that sees an IP forwarding device/subnet addition into the network, for which the switch device has no existing multicast distribution tree it has joined. In particular embodiments, the switch device may be configured to look up the unicast route table to select one of the next hop switch it can use to reach the root tree switch. Based on this information, the switch device may be configured to send a unicast tree join message to the next hop. The next hop may add the interface to its OIF list, if not already present, and in turn, joins the multicast distribution tree if it has not already joined the multicast distribution tree. This process tree branch construction may end when another multicast distribution tree branch or the root switch is reached.

In particular embodiments, if the network supports multicast routing but does not support accelerated (for example, hardware implemented) Layer 3 IP forwarding domain multicast forwarding, tunneled multicast routing may be used in conjunction with the shared multicast distribution tree based distribution to improve performance. More specifically, in tunneled multicast routing, the broadcast or subnet scoped multicast traffic is encapsulated/tunneled using an outer IP multicast header. The outer IP multicast header may be configured to act as the transport, and the original subnet scoped multicast or broadcast packet may be configured as payload.

In this manner, in particular embodiments, original multicast packets from hosts may be encapsulated in another multicast header and sent over a multicast distribution tree. All intermediate IP forwarding devices in the Layer 3 IP forwarding domain may be configured to switch the encapsulated multicast packet based on the outer header and decrement the TTL/hop limit in the outer header. Before forwarding the multicast packet over a host port, the IP forwarding device may be configured to de-encapsulate the multicast packet and send the original multicast packet to all hosts that belong to the source subnet associated with the multicast distribution tree.

That is, in particular embodiments, the IP forwarding device may be configured to decrement the TTL/hop limit in the outer IP multicast header (the outer header or tunnel header) and maintain the original TTL/hop limit in the original IP header of the data packet. In this manner, the IP forwarding device may switch a data packet in layer 3 and decrement TTL/hop limit while maintaining the original TTL/hop limit untouched.

As discussed above, tunneling fragmentation may be performed by the ingress IP forwarding device in the Layer 3 IP forwarding domain, and reassembly may be performed by the egress IP forwarding device. In particular embodiments, tunneling fragmentation may be avoided by, for example, maintaining the egress links from the Layer 3 IP forwarding domain at a minimum of 20 or 40 bytes (for IPv4 or IPv6, respectively) less than the internal links in the Layer 3 IP forwarding domain in order to account for the extra outer IP multicast header.

In the case where tunneling fragmentation is performed, the IP forwarding device may be configured to enable path MTU discovery mechanism to improve to efficiency of the network when smarter end host stacks or applications are used.

In particular embodiments, the shared tree based multicast traffic distribution may include a single multicast distribution tree for all subnets and IP forwarding devices, or network devices in the Layer 3 IP forwarding domain with a single known root IP forwarding device for the single multicast distribution tree, or alternatively, may include multiple multicast distribution trees.

Single Multicast Distribution Tree

Using a single multicast distribution tree for all subnets and IP forward devices or network devices, in particular embodiments, the ingress IP forwarding device is configured to unicast tunnel the multicast data traffic to the root of the multicast distribution tree to be distributed down to the edges of the multicast distribution tree. The root IP forwarding device may be configured to de-encapsulate the unicast tunneled passed to it, may add a multicast header (if needed for hardware acceleration), and forward the traffic down to the edges of the multicast distribution tree. In particular embodiments, the source IP address of the multicast traffic may be used to identify the first IP forwarding device, copied over from the unicast tunneled packet, rather than carrying the ingress IP forwarding device identification in another field of the data packet.

In particular embodiments, each IP forwarding device in the Layer 3 IP forwarding domain may be configured to send a copy of the received packet to its processing unit (such as a CPU), if the CPU is interested in the subnet scoped multicast traffic. The IP forwarding device may be also configured to distribute the multicast traffic to all ports which are members of the multicast distribution tree. Additionally, the IP forwarding device, upon receiving the traffic, may be further configured to check if it has any host ports that are associated with the original source subnet, in which case, the data packet is de-encapsulated and the original packet is sent to the host port.

To prevent packet duplication in the ingress IP forwarding device's ingress port which may occur as the multicast traffic source may be a member of the distribution tree, the ingress IP forwarding device may be configured to suppress de-encapsulating the packet based on verification of whether there are any host ports that are associated with the original source subnet. That is, an inspection of the source IP address in the outer IP multicast packet in one embodiment will provide information on whether the multicast traffic source may be a member of the distribution tree. Moreover, in this case, the ingress IP forwarding device is configured to send a copy of the original IP multicast or broadcast packet to the host ports directly connected to it and also to unicast tunnel the original IP multicast or broadcast packet to the root for distribution over the multicast distribution tree.

Multiple Multicast Distribution Trees

In particular embodiments, multiple multicast distribution trees are generated. For example, there may be one distribution tree for each multicast traffic source multiplied by the number of IP subnets supported by the Layer 3 IP forwarding domain. That is, in the case where there are 25 IP forwarding devices in the Layer 3 IP forwarding domain, and 10 subnets, there may be up to 250 distribution trees generated. In one aspect, if an IP forwarding device does not have hosts directly connected to or connected indirectly through it, and that depends on the IP forwarding device for connectivity, or a local CPU for a particular subnet, the IP forwarding device may be configured such that it does not join the multicast distribution tree for that particular subnet for each IP forwarding device other than itself. In this manner, only the traffic that is useful for the IP forwarding device may be received, which in turn, would provide bandwidth usage optimization.

In one aspect, whenever an IP forwarding device joins the Layer 3 IP forwarding domain, all other IP forwarding devices may be configured to construct one or more shared tree towards the newly joined IP forwarding device, and rooted at the newly joined IP forwarding device.

When subnet scoped multicast or broadcast data traffic is received by an IP forwarding device, in particular embodiments, a copy of the received data packet is sent to the local CPU if the CPU has indicated interest for the multicast traffic, and a copy of the received data packet is also sent to the host ports directly connected to the IP forwarding device that have a host which belongs to the subnet and are interested in the multicast traffic. The multicast packet is then encapsulated in another multicast header, and is pushed down the source specific multicast distribution tree, of which the ingress IP forwarding device is the root.

Moreover, in particular embodiments, each IP forwarding device may be configured to examine if its CPU is interested in the multicast packet, in which case, a copy of the received multicast packet is sent to the CPU, and to other host ports connected directly to it that belongs to the subnet and would be interested in the multicast packet. Also, the multicast packet is distributed down the distribution tree. If the multicast packet is encapsulated, then it is de-encapsulated before sending the packet out of the host ports.

In this manner, in particular embodiments, encapsulation/de-encapsulation processing load may be distributed over the ingress and egress IP forwarding devices. Additionally, hardware forwarding/accelerated multicast forwarding may be attained within the network cloud, and further, the approach in particular embodiments is not subject to a single point of failure.

Unicast Tunnel Based Traffic Distribution

In particular embodiments, each IP forwarding device in the Layer 3 IP forwarding domain may be configured to learn of the other IP forwarding devices in the Layer 3 IP forwarding domain such that a full mesh of logical tunnels may be generated. Each IP forwarding device may be configured to open a point to point unicast tunnel with every other IP forwarding device. When a subnet scoped multicast or broadcast packet is received, in particular embodiments, the ingress IP forwarding device is configured to tunnel the received packet to the other IP forwarding devices in the Layer 3 IP forwarding domain.

As in the case of shared tree based traffic distribution, fragmentation may be necessary, in which case, reassembly may be performed at the tunnel endpoint. Alternatively, as discussed above, fragmentation may be avoided by having the MTUs of the inter IP forwarding device links set to 20/40 bytes (for IPv4/IPv6, respectively) more than the Layer 3 IP forwarding domain's external ports. In particular embodiments, the tunnel endpoint may be configured to de-encapsulate the packet, and send a copy of the packet to the local CPU if there is an interest shown for the packet. Thereafter, the IP forwarding device may be configured to send the packet to all interested subnet host ports directly connected to it.

In an alternate embodiment, a predetermined number of designated tunnel IP forwarding devices may be designated. In this case, all ingress subnet scoped multicast traffic from the ingress IP forwarding device after being copied to the local host ports and CPU, are sent to one of the predetermined number of designated tunnel IP forwarding devices. In turn, one of the predetermined number of designated tunnel IP forwarding devices may be configured to push the data traffic to all other IP forwarding devices (other than the ingress IP forwarding device) in the Layer 3 IP forwarding domain. Also, in particular embodiments, to avoid a potential loop, traffic received on a tunnel endpoint from the one of the predetermined number of designated tunnel IP forwarding devices is not re tunneled.

Flooding with Designated RPF Interface Selection Logic

In particular embodiments, IP forwarding device in the Layer 3 IP forwarding domain may be configured to perform a RPF lookup for each multicast packet it receives. If the source IP address of the received multicast packet belongs to an unspecified class, the packet is rate limited and sent to the local CPU for further processing. An example may include a DHCP/BOOTP request which may be forwarded using a relay or a predetermined helper application.

If it is determined that there is a single RPF interface to the source of the multicast packet, then the single RPF interface is selected. On the other hand, if it is determined that there are multiple RPF interfaces to reach the source, the IP forwarding device may be configured to select one of the multiple RPF interfaces as the designated RPF interface. In particular embodiments, the selection of the designated RPF interface may be based on one or more factors including, for example, ingress load on the interface, reliability metric of the interface, bandwidth of the interface, user hint, or a predetermined selection criteria. Further, in particular embodiments, dynamic selection or re-balancing of an ingress RPF interface may be used.

If the multicast traffic is received on a host port and the RPF verification fails—that is, the host port interface is determined to not be the designated RPF interface, then a rate limited exception is generated to enable source IP address learning, as necessary. However, the multicast traffic is dropped and not forwarded. If the multicast traffic is received on any other interface and the RPF verification fails, then the traffic is likewise dropped and not forwarded.

On the other hand, if the multicast traffic is received on the designated RPF interface, the multicast traffic is flooded out of all host ports connected to the IP forwarding device which has at least one host belonging to the traffic source's subnet and all the other non host ports. Also, a copy of the packet is transmitted to the local CPU in the case where it has indicated an interest for the particular multicast group or broadcast traffic.

In particular embodiments, multicast loop maybe avoided by having the source attached to only one point in the Layer 3 IP forwarding domain that the source connects to, and by having all unicast or multicast traffic to pass a predetermined level of RPF verification. In other words, the IP forwarding devices in the Layer 3 IP forwarding domain have a route for each host in the domain subnets. In this manner, the route for each host may provide the IP forwarding device with information related to one or more interfaces that may be used to reach the host.

In this manner, in particular embodiments, flooding with designated RPF interface selection logic may provide, for example, simplicity without the need for control messaging, and faster convergence where no control signaling other than route propagation may be needed.

Figure 3:
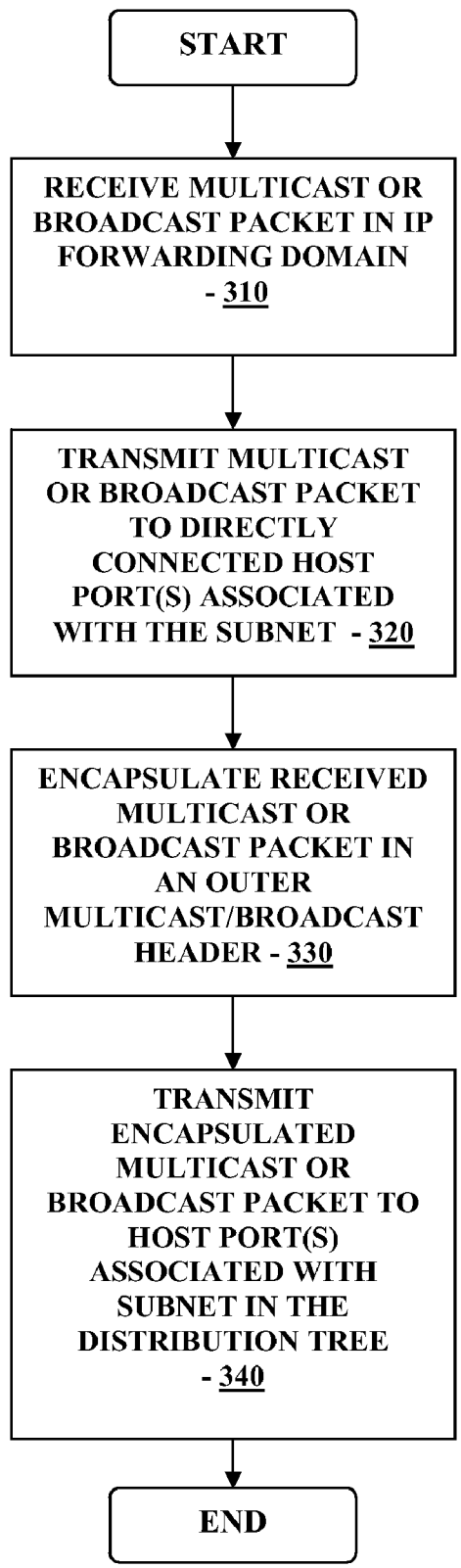
FIG. 3 illustrates an example method for routing subnet scoped multicast or broadcast packet with a distribution tree in the IP forwarding domain.

FIG. 3 illustrates an example method for routing subnet scoped multicast packet with a distribution tree in the IP forwarding domain. Referring to FIG. 3, subnet scoped multicast or broadcast packet is received at step 310. Thereafter, at step 320, the received packet is transmitted or sent to the directly connected host ports that are associated with the subnet. The multicast/broadcast packet may be encapsulated with an outer multicast/broadcast header at step 330, and the encapsulated multicast packet at step 340 is transmitted to host ports associated with the subnet in the multicast distribution tree. In this manner, in particular embodiments, subnet scoped multicast or broadcast traffic may be distributed in an IP forwarding domain.

Figure 4:
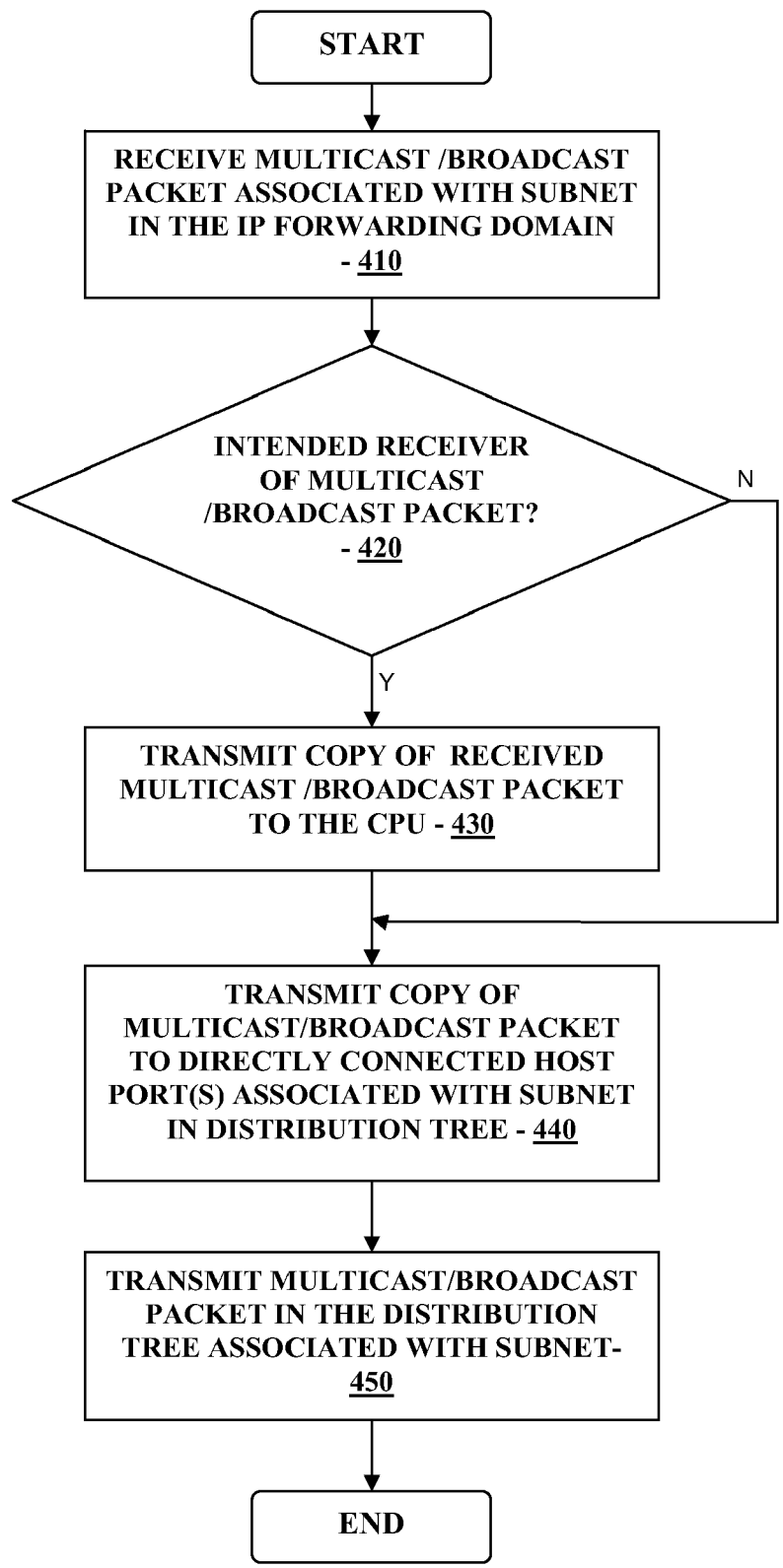
FIG. 4 illustrates an example method for routing subnet scoped multicast or broadcast packet with multiple distribution tree in the IP forwarding domain.

FIG. 4 illustrates an example method for routing subnet scoped multicast/broadcast packet with multiple distribution trees in the IP forwarding domain. Referring to FIG. 4, at step 410, a multicast/broadcast packet associated with a subnet in the IP forwarding domain is received. Thereafter, it is determined whether the network device such as the IP forwarding device is the intended receiver of the multicast/broadcast packet at step 420. If it is determined that it is the intended receiver of the multicast/broadcast packet, a copy of the received multicast/broadcast packet is sent or transmitted to the local processing unit such as the CPU.

On the other hand, if it is determined that the network device is not the intended receiver of the multicast packet received, then at step 440, a copy of the multicast/broadcast packet received is send to host port(s) that are directed connected to the network device, and which are associated with the subnet in the distribution tree. Moreover, the routine at step 440 is performed after the copy of the received multicast/broadcast packet is send to the local CPU at step 430. Referring to FIG. 4, at step 450, the multicast/broadcast packet is transmitted in the distribution tree associated with the subnet.

Figure 5:
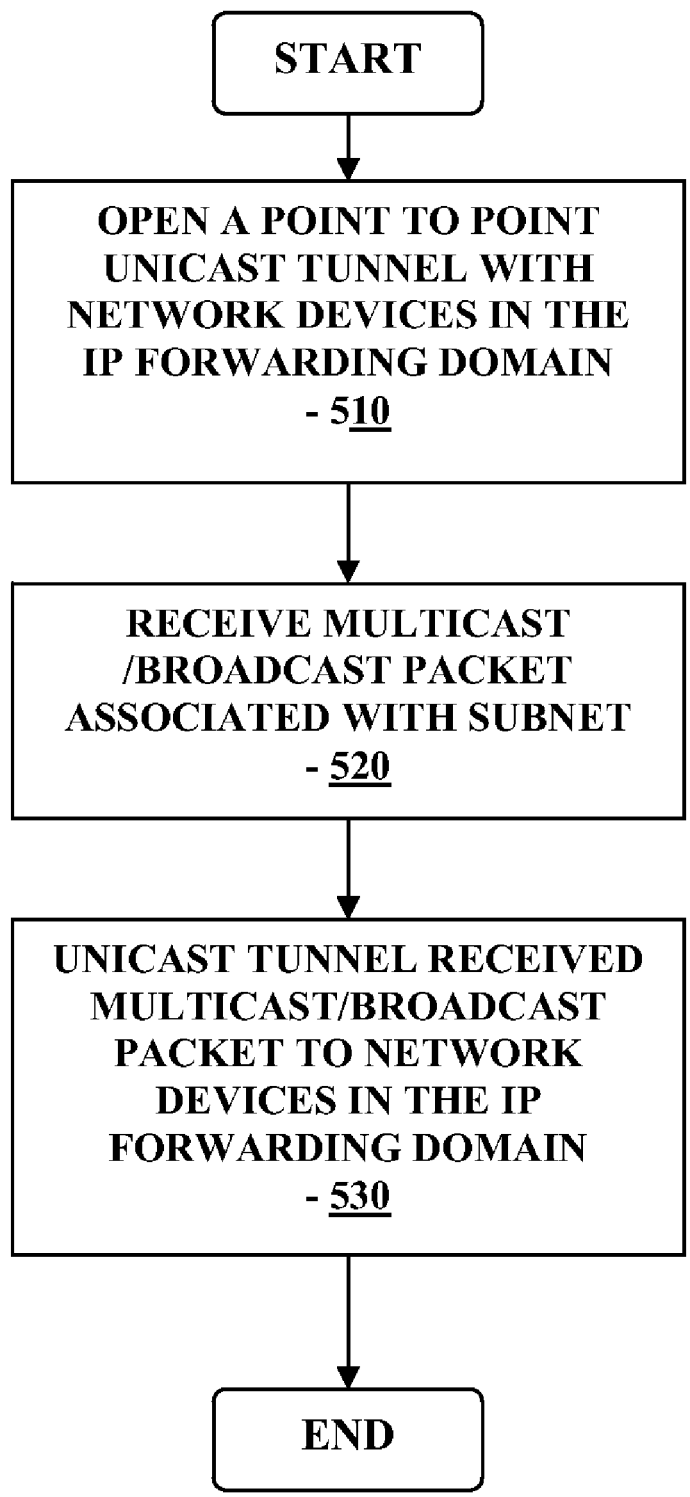
FIG. 5 illustrates an example method for routing subnet scoped multicast or broadcast packet with unicast tunnel based distribution in the IP forwarding domain.
Figure 6:
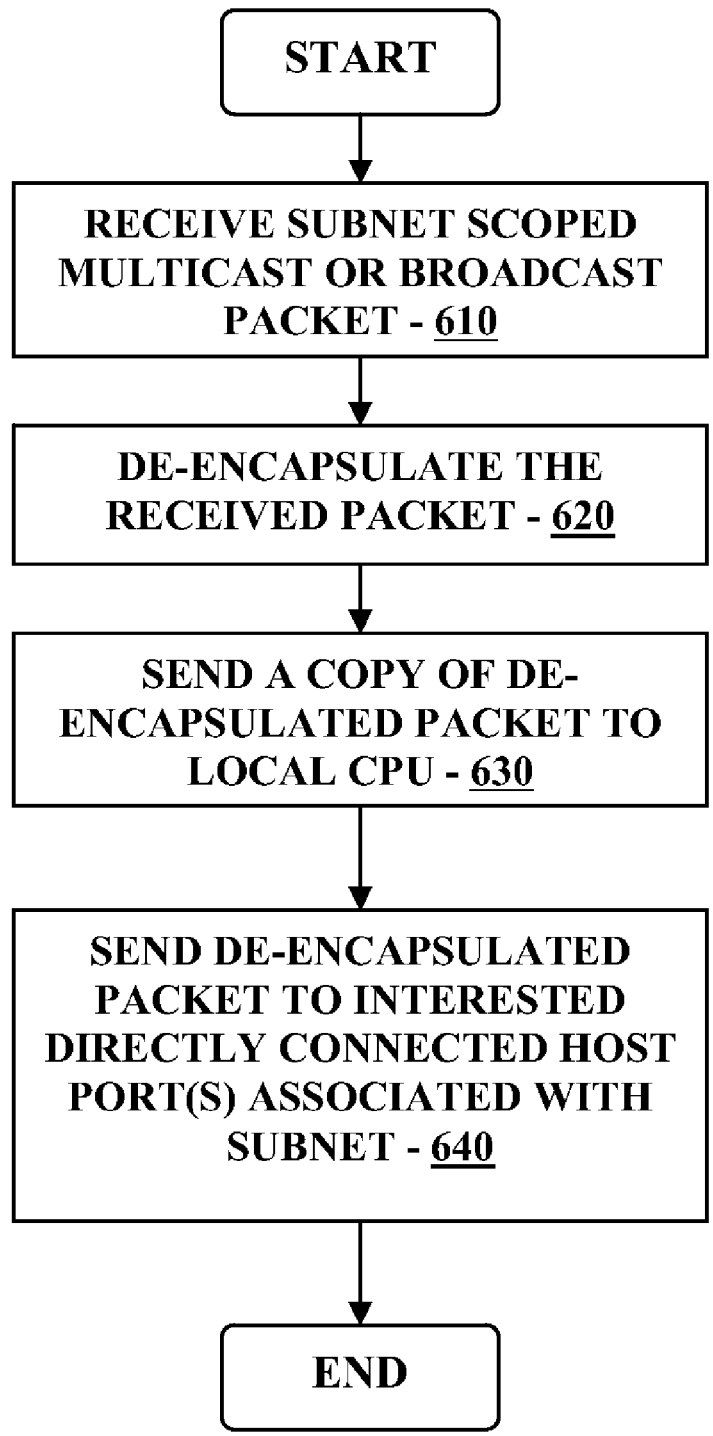
FIG. 6 illustrates an example method for routing subnet scoped multicast or broadcast packet with unicast tunnel based distribution at the distribution tree endpoint.

FIG. 5 illustrates an example method for routing subnet scoped multicast/broadcast packet with unicast tunnel based distribution in the IP forwarding domain. Referring to FIG. 5, at step 510, a point to point unicast tunnel is opened with each network device in the IP forwarding domain. Thereafter, at step 520, when the subnet scoped multicast/broadcast packet associated with the subnet is received, the received multicast packet is unicast tunneled to network devices in the IP forwarding domain. At the endpoint, as shown in FIG. 6 illustrating an example method for routing subnet scoped multicast packet with unicast tunnel based distribution at the distribution tree endpoint, when the subnet scoped multicast or broadcast packet is received at step 610, the received packet is de-encapsulated at step 620, and a copy of the de-encapsulated packet is sent to the local processor such as the CPU at step 630. Further, as shown in FIG. 6, the de-encapsulated packet is sent to interested or intended and directly connected host port(s) associated with the subnet.

Figure 7:
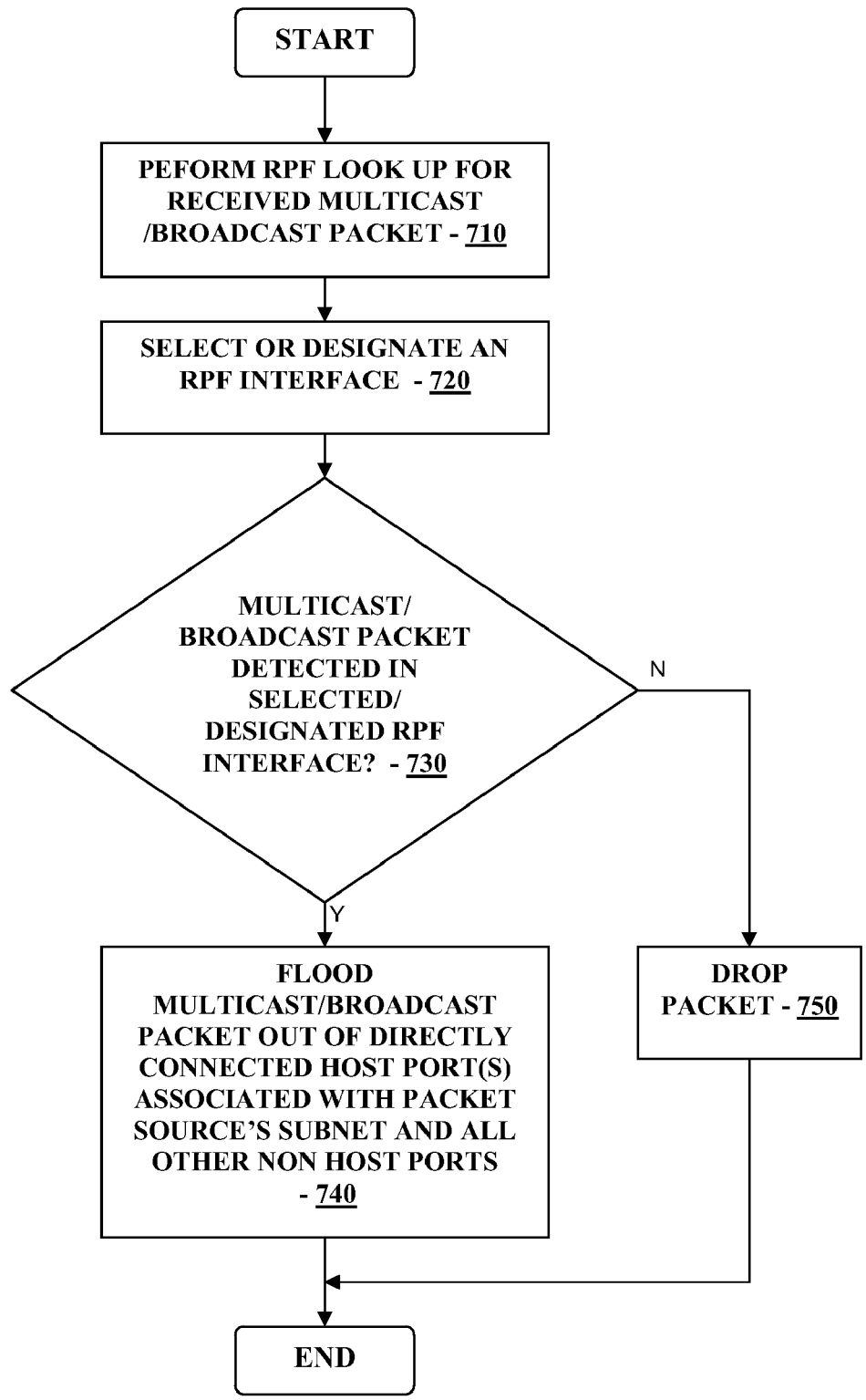
FIG. 7 illustrates an example method for routing subnet scoped multicast or broadcast packet with RPF interface in the IP forwarding domain.

FIG. 7 illustrates an example method for routing subnet scoped multicast/broadcast packet with RPF interface in the IP forwarding domain. Referring to FIG. 7, at step 710, RPF look up is performed for the received subnet scoped multicast or broadcast packet. Thereafter, an RPF interface is selected or designated from one or more predetermined RPF interfaces at step 720. At step 730, it is determined whether the multicast/broadcast packet is detected in the selected or designated RPF interface. If it is determined that the multicast/broadcast packet is not detected at the selected or designated RPF interface, then at step 750, the received multicast/broadcast packet is dropped and the routine ends. Referring back to FIG. 7, if at step 730 it is determined that the multicast/broadcast packet is received at the selected/designated RPF interface, then at step 740, the multicast/broadcast packet is flooded out of the directly connected host port(s) associated with the packet source's subnet and all other non host ports.

In this manner, in particular embodiments, the original multicast or broadcast packets from hosts are encapsulated in another multicast header and sent over a multicast distribution tree. For example, in particular embodiments, the subnet scoped multicast or broadcast packets may be encapsulated with a user datagram protocol (UDP) datagram. Additionally, in a further aspect, any quality of service (QOS) marking on the subnet scoped multicast or broadcast packets may be copied to the encapsulating headers to preserve the intended QOS settings. Moreover, at the ingress, in particular embodiments, traffic suppression and/or throttling may be implemented by, software and/or hardware, for example, using ACLs as desired.

More specifically, in particular embodiments, when an IP forwarding device receives a subnet scoped multicast or broadcast data traffic, the hardware/software may be configured to append an outer IP multicast header (or a tunnel header) with the configured multicast group on the original received data packet. The original data packet with the outer IP multicast header appended is forwarded in accordance with the appended outer IP multicast header. The intermediate IP forwarding devices and router may be configured to route the packet based on outer header and decrement the TTL in the outer header. Before the packet is forwarded to the intended receivers, the last hop IP forwarding device may be configured to strip the outer IP header and deliver the original IP packet on the host port. The IP forwarding device de-encapsulates the packet and sends the original multicast packet to all hosts that belong to the source subnet.

In the manner described, in particular embodiments, subnet scoped multicast or broadcast traffic may be distributed to end hosts belonging to a particular subnet, where the majority of the hosts of the particular subnet are connected by one or more layer 3 hops. In particular embodiments, there is provided automatic creation of IP forwarding device and subnet based shared tree in the control plan with little or no administrative configuration. The switches in the network may be configured to automatically prune the shared tree if no hosts are detected connected to the subnet. Moreover, when a network device or node in the distribution tree is lost, when an alternate path exists, the link may be automatically repaired. In this manner, in particular embodiments, network efficiency may be attained, and the processing capability of the edge switches may be leveraged, while avoiding a single point of bottle neck or failure.

Accordingly, a method, in one embodiment includes receiving a data packet in a data forwarding domain, encapsulating a header to the received data packet, and routing the encapsulated data packet in the data forwarding domain over a distribution tree.

The data packet may include one or more of a subnet scoped multicast packet or a broadcast packet.

The header includes an Internet Protocol (IP) header, and further, the header may include a User Datagram Protocol (UDP) datagram.

The method may also include de-encapsulating the encapsulated data packet.

Further, in particular embodiments, the method may also include routing of the de-encapsulated data packet to one or more directly connected host ports in the distribution tree, where the distribution tree may be associated with a subnet.

A method in a further embodiment may include opening a point to point unicast tunnel with one or more network devices in a data forwarding domain, receiving a data packet, tunneling the received data packet to the one or more network devices in the data forwarding domain.

The method may also include sending a copy of the de-encapsulated tunneled data packet to directly connected one or more host ports in the data forwarding domain, where the data packet may be received from a multicast source.

An apparatus in particular embodiments includes a network interface, one or more processors coupled to the network interface, and a memory for storing instructions which, when executed by the one or more processors, causes the one or more processors to cause the one or more processors to receive a data packet in a data forwarding domain, encapsulate a header to the received data packet, and route the encapsulated data packet in the data forwarding domain over a distribution tree.

An apparatus in still another embodiment may include a network interface, one or more processors coupled to the network interface, and a memory for storing instructions which, when executed by the one or more processors, causes the one or more processors to cause the one or more processors to open a point to point unicast tunnel with one or more network devices in a data forwarding domain, receive a multicast packet, and tunnel the received data packet to the one or more network devices in the data forwarding domain.

A system in yet another embodiment may include means for receiving a data packet in a data forwarding domain, means for encapsulating a header to the received data packet, and means for routing the encapsulated data packet in the data forwarding domain over a distribution tree.

The various processes described above including the processes performed by the hosts 120A, 120B, 120C, 120D, 120E, 120F, 120G, 120H, the IP forwarding devices 130A, 130B, 130C, 130D, the intermediate routers 140A, 140B, and the domain border routers 150A, 150B in the software application execution environment in the data network 100 including the processes and routines described in conjunction with FIGS. 3-7, may be embodied as computer programs developed using an object oriented language that allows the modeling of complex systems with modular objects to create abstractions that are representative of real world, physical objects and their interrelationships. The software required to carry out the inventive process, which may be stored in the memory or storage unit 210 of the network device 200 which may correspond to one or more of the IP forwarding devices 130A, 130B, 130C, 130D, the intermediate routers 140A, 140B, or the domain border routers 150A, 150B, may be developed by a person of ordinary skill in the art and may include one or more computer program products.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:
   receiving, at an interface of a first router, a data packet in a data forwarding domain, wherein the data packet is either a subnet scoped multicast packet or a subnet scoped broadcast packet relative to a subnet of the interface of the first router on which the data packet is received, and the subnet scoped packet is normally not forwarded;
   encapsulating a header to the received subnet scoped data packet;
   forwarding the encapsulated subnet scoped data packet from at least one other interface of the first router; and
   routing the encapsulated subnet scoped data packet in the data forwarding domain over a distribution tree to a second router for delivery to a host wherein
      the host is directly connected to an interface of the second router, and
      the host belongs to the subnet of the interface of the first router on which the data packet was received.

2. The method of claim 1 wherein the header includes an Internet Protocol (IP) header.

3. The method of claim 1 wherein the header includes a User Datagram Protocol (UDP) datagram.

4. The method of claim 1 further including de-encapsulating the encapsulated data packet.

5. The method of claim 4 further including routing the de-encapsulated data packet to one or more directly connected host ports in the distribution tree.

6. The method of claim 1 wherein the distribution tree is associated with the subnet of the interface of the first router on which the data packet was received.

7. A method, comprising:
   opening a point to point unicast tunnel between a router and at least one network device in a data forwarding domain;
   receiving, at an interface of the router, a data packet, wherein the data packet is either a subnet scoped multicast packet or a subnet scoped broadcast packet relative to a subnet of the interface of the router on which the data packet is received, and the subnet scoped packet is normally not forwarded;
   tunneling the received subnet scoped data packet across the point to point unicast tunnel from the router to the at least one network device in the data forwarding domain; and
   forwarding the received subnet scoped data packet from the at least one network device to a host directly connected to the at least one network device, wherein the host belongs to the subnet of the interface of the router on which the data packet was received.

8. The method of claim 7 wherein the data packet includes an Internet Protocol (IP) header.

9. The method of claim 8 wherein the header includes a User Datagram Protocol (UDP) datagram.

10. The method of claim 7 further including
    encapsulating the data packet; and
    de-encapsulating the tunneled data packet.

11. The method of claim 10 further including sending a copy of the de-encapsulated tunneled data packet to directly connected one or more host ports in the data forwarding domain.

12. The method of claim 7 wherein the data packet is received from a multicast source.

13. An apparatus, comprising:
    a first network interface;

a second network interface;
one or more processors coupled to the first and second network interfaces; and
a memory for storing instructions which, when executed by the one or more processors, causes the one or more processors to
receive, from the first network interface, a data packet in a data forwarding domain, wherein the data packet is either a subnet scoped multicast packet or a subnet scoped broadcast packet relative to a subnet of the first network interface, and the subnet scoped packet is normally not forwarded,
encapsulate a header to the received subnet scoped data packet,
forward the encapsulated subnet scoped data packet from the second network interface, and
route the encapsulated subnet scoped data packet in the data forwarding domain over a distribution tree for receipt by at least one router for delivery to a host directly connected to the at least one router, wherein the host belongs to the subnet of the first network interface.

14. The apparatus of claim 13 wherein the header includes a User Datagram Protocol (UDP) datagram.

15. The apparatus of claim 13 wherein the distribution tree is associated with the subnet of the first network interface.

16. An apparatus, comprising
a network interface;
one or more processors coupled to the network interface; and
a memory for storing instructions which, when executed by the one or more processors, causes the one or more processors to
open a point to point unicast tunnel with at least one network device in a data forwarding domain,
receive, from the network interface, a subnet scoped multicast packet relative to a subnet of the network interface, wherein the subnet scoped multicast packet is normally not forwarded, and
tunnel the received subnet scoped multicast packet across the point to point unicast tunnel to the at least one network device in the data forwarding domain for delivery to a host directly connected to the at least one network device, wherein the host belongs to the subnet of the network interface on which the subnet scoped multicast packet was received.

17. The method of claim 1, wherein the received data packet is the subnet scoped multicast packet,
the header encapsulating the received subnet scoped multicast packet is a multicast header, and
the router receiving the subnet scoped multicast packet is the root of the distribution tree.

18. The method of claim 4, further comprising:
forwarding the de-encapsulated data packet from an interface of the at least one other router, wherein the interface of the at least one other router belongs to a subnet other than the subnet of the interface of the first router on which the data packet was received.

19. The apparatus of claim 13, wherein the received data packet is the subnet scoped multicast packet,
the header encapsulating the received subnet scoped multicast packet is a multicast header, and
the router receiving the subnet scoped multicast packet is the root of the distribution tree.

* * * * *